United States Patent [19]
Paisley

[11] Patent Number: 5,494,653
[45] Date of Patent: Feb. 27, 1996

[54] METHOD FOR HOT GAS CONDITIONING

[75] Inventor: Mark A. Paisley, Upper Arlington, Ohio

[73] Assignee: Battelle Memorial Institute, Columbus, Ohio

[21] Appl. No.: 113,167

[22] Filed: Aug. 27, 1993

[51] Int. Cl.$^6$ .................. C01B 3/16; C01B 3/26
[52] U.S. Cl. .............. 423/652; 252/373; 423/656
[58] Field of Search .................. 423/652, 656; 252/373

[56] References Cited

U.S. PATENT DOCUMENTS

| | | |
|---|---|---|
| 233,861 | 11/1880 | Jerzmanowski . |
| 1,295,825 | 2/1919 | Ellis . |
| 1,875,923 | 9/1932 | Harrison . |
| 1,903,845 | 4/1933 | Wilcox . |
| 1,977,684 | 10/1934 | Lucke ................................ 48/206 |
| 1,992,909 | 2/1935 | Davis ................................ 48/196 |
| 2,405,395 | 8/1946 | Bahlke et al. ..................... 260/679 |
| 2,546,606 | 3/1951 | Mayland .......................... 252/373 |
| 2,571,953 | 10/1951 | Shapleigh ........................ 423/652 |
| 3,222,132 | 12/1965 | Dowden .......................... 423/652 |
| 3,922,337 | 11/1975 | Campbell et al. ............... 423/656 |
| 4,726,913 | 2/1988 | Brophy et al. .................. 252/373 |
| 4,888,131 | 12/1989 | Goetsch et al. ................. 252/373 |
| 5,143,647 | 9/1992 | Say et al. ........................ 252/373 |
| 5,177,303 | 1/1993 | Griffiths et al. ................ 252/373 |

FOREIGN PATENT DOCUMENTS

| | | | |
|---|---|---|---|
| 516588 | 9/1955 | Canada ........................ 423/652 |
| 461402 | 2/1937 | United Kingdom . |

Primary Examiner—Wayne Langel
Attorney, Agent, or Firm—Klaus H. Wiesmann

[57] ABSTRACT

A method for cracking and shifting a synthesis gas by the steps of providing a catalyst consisting essentially of alumina in a reaction zone; contacting the catalyst with a substantially oxygen free mixture of gases comprising water vapor and hydrocarbons having one or more carbon atoms, at a temperature between about 530° C. (1000° F.) to about 980° C. (1800° F.); and whereby the hydrocarbons are cracked to form hydrogen, carbon monoxide and/or carbon dioxide and the hydrogen content of the mixture increases with a corresponding decrease in carbon monoxide, and carbon formation is substantially eliminated.

33 Claims, 3 Drawing Sheets

METHOD FOR HOT GAS CONDITIONING

STATEMENT OF GOVERNMENT INTEREST

This invention was made with government support under Contract No. YM-2-11110-1 awarded by the Department of Energy. The Government has certain rights in this invention.

FIELD OF THE INVENTION

The invention includes a method of using an alumina catalyst for shifting and cracking an input gas to provide a feed gas suitable for hydrocarbon synthesis (e.g. methanol synthesis). The method allows the reaction with minimum or substantially no carbonization and with higher yields than heretofore possible. Further, the method does not require the use of metals such as nickel or molybdenum that are hazardous to the environment.

BACKGROUND OF THE INVENTION

The production of a feed gas for hydrogen synthesis using gasification requires the use of a catalyst to adjust the hydrogen to carbon monoxide ratio by the water gas shift reaction, $$CO+H_2O \rightarrow CO_2+H_2$$

and, if alcohols are the desired product, to crack hydrocarbons to a mixture of hydrogen and carbon monoxide, by the reaction, $$C_nH_m+(n/2)O_2 \rightarrow nCO+(m/2)H_2$$

Both of these reactions must be done in such a way as to not promote the formation of carbon, an undesired byproduct. Conventional catalyst systems and methods for these reactions require the use of noble metals such as nickel, molybdenum, and the like, or of alkali materials such as potassium, sodium, and the like. Further, conventional catalyst systems and methods do not suppress carbon to the desired extent. Typical of these and other gas production operations are the following U.S. Pat. Nos. 233,861 to Jerzmanowski; 1,295,825 to Ellis; 1,875,923 to Harrison; 1,903,845 to Wilcox; 1,977,684 to Lucke; 1,992,909 to Davis; 2,405,395 to Bahlke et al; 2,546,606; 3,922,337 to Campbell et al; 4,726,913 to Brophy et al; 4,888,131 to Goetsch et al; 5,143,647 to Say et al; and British patent GB 461,402 (Feb. 16, 1937).

SUMMARY OF THE INVENTION

The first embodiment of the invention typically includes a method for cracking and shifting a synthesis gas by providing a catalyst consisting essentially of alumina; and contacting the catalyst with the synthesis gas comprising a substantially oxygen free mixture of gases of water vapor and hydrocarbons having one or more carbon atoms, at a temperature between about 530° C. (1000° F.) to about 980° C. (1800° F.); whereby the hydrocarbons are cracked to form hydrogen, carbon monoxide and/or carbon dioxide and the hydrogen content of the mixture shifted so as to increase with a corresponding decrease in carbon monoxide, and whereby carbon formation is substantially eliminated.

A further embodiment of the invention typically includes a method for cracking and shifting a synthesis gas by providing a catalyst consisting essentially of alumina; contacting the alumina catalyst with a substantially oxygen free synthesis gas of: methane and/or higher hydrocarbons; and water vapor; at a temperature of about 5300° C. to about 980° C., whereby methane and higher hydrocarbons are cracked according to the reaction, $$C_xH_{2y}+xH_2O=xCO+(1+y+x)H_2$$

and shifted by the reaction $$CO+H_2O=CO_2+H_2$$

and whereby carbon formation is substantially eliminated.

A yet further embodiment of the invention typically includes a method for cracking and shifting a substantially oxygen free synthesis gas comprising: (a) providing a reaction zone with a catalyst consisting essentially of alumina; (b) flowing the synthesis gas into the reaction zone and contacting the catalyst; (c) simultaneously with step b, flowing 0 to about 80 volume percent water vapor into contact with the catalyst; at a temperature of about 530° C. to about 980° C., whereby methane and higher hydrocarbons in the synthesis gas are cracked according to the reaction, $$C_xH_{2y}+xH_2O=xCO+(1+y+x)H_2$$

and shifted by the reaction, $$CO+H_2O=CO_2+H_2$$

and whereby carbon formation is substantially eliminated.

The above embodiments typically can provide that the contacting is carried out in a fluidized bed reactor, or in a recirculating fluidized bed gasifier, or in a fixed bed reactor.

A further embodiment of the invention typically includes a method for cracking and shifting a synthesis gas comprising: (a) providing a catalyst consisting essentially of granulated alumina; (b) contacting the catalyst with the synthesis gas comprising a substantially oxygen free mixture of gases of water vapor and hydrocarbons having one or more carbon atoms, at a temperature between about 530° C. (1000° F.) to about 980° C. (1800° F.); (d) circulating the catalyst between a gasifier where the contacting is accomplished, and a combustor where the catalyst is heated to maintain the temperatures when the catalyst is recirculated to the gasifier; and whereby the hydrocarbons are cracked to form hydrogen, carbon monoxide and/or carbon dioxide and the hydrogen content of the mixture increases with a corresponding decrease in carbon monoxide, and whereby carbon formation is substantially eliminated.

The above embodiments can typically provide that the substantially oxygen free mixture of gases also contains carbon monoxide and/or hydrogen. They typically have a gaseous hourly space velocity greater than about 1000 m³/m³·hr, and can typically complete the cracking and shifting reactions in one reaction zone. Typically the temperature is preferably between about 650° C. to about 870° C.

The invention typically also provides for new uses for alumina. A composition consisting essentially of alumina is able to be used in catalytic reactions where only combinations of materials often hazardous to dispose of have been used. The new use in catalytic reactions provides results equal to or better than the previous materials without the attendant disposal problems.

DETAILED DESCRIPTION OF THE INVENTION AND BEST MODE

Figure 1:
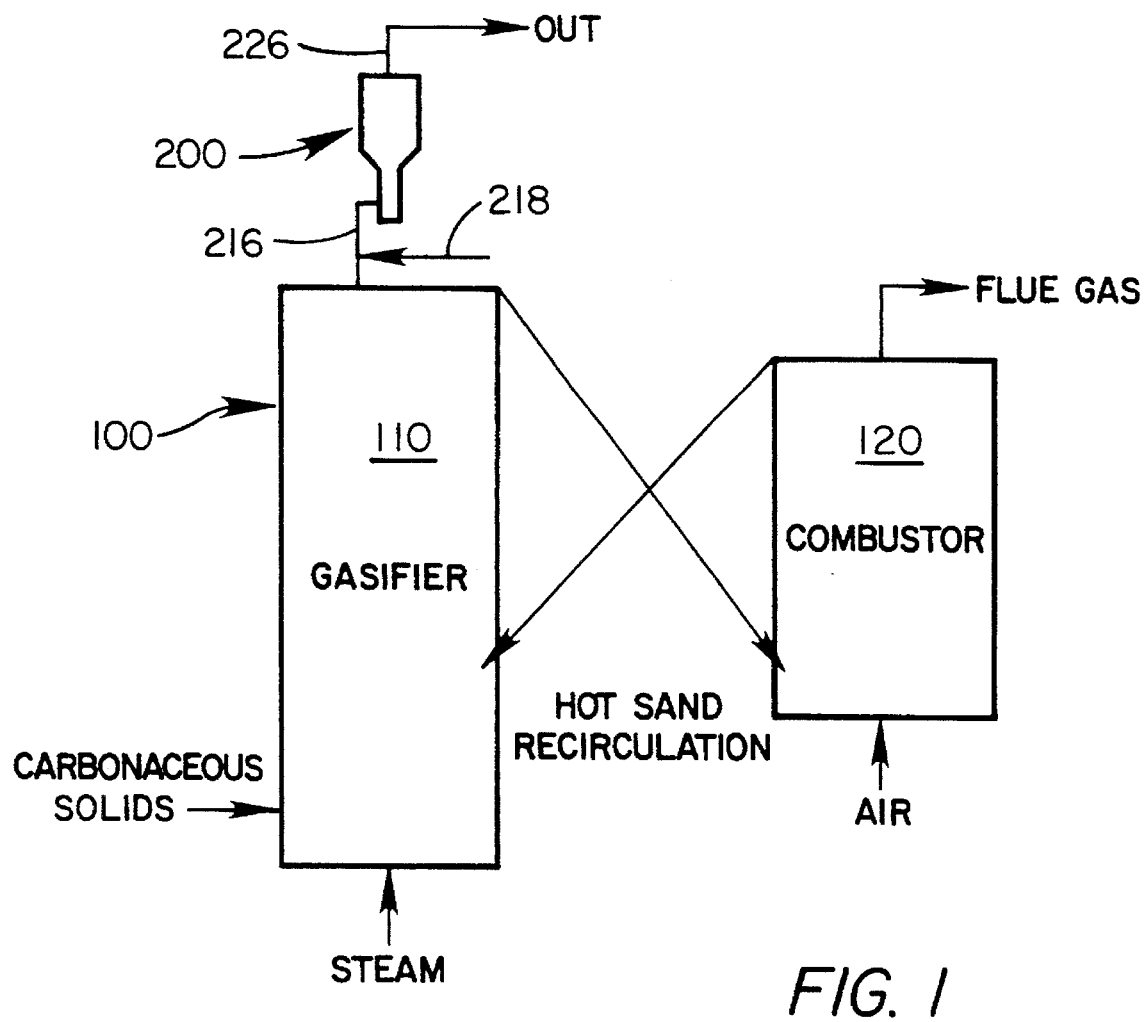
FIGS. 1 illustrates the gasifier and reactor arrangement used for the examples herein.

One aspect of the invention involves hot-gas conditioning of synthesis gas produced from an indirectly fired gasification process. This process utilizes a circulating stream of hot sand as an indirect heat transfer agent to perform the gasification reactions. Almost any carbonaceous feedstock to the gasifier is useful with the present invention. Typical examples of useful feedstocks include coal, lignite, peat, municipal waste, wood, energy plantation crops, agricultural and forestry residues, and the like. When biomass feedstocks are used, the inherently high reactivity of the biomass feedstocks allows such an indirect heating method to be readily adapted for gasification in a short residence time reactor system such as a circulating fluid bed. A medium-Btu gas, that is useful for chemical synthesis, is produced; however, the method herein applies to all manner of feedstocks and gasifiers. The reaction chamber used for the present invention can be installed directly after the output of the gasifier as shown in FIG. 1.

Another aspect of the invention is the use of hot-gas conditioning as a means of producing an enhanced synthesis gas for subsequent chemical production. In gasification, the carbonaceous feedstock is converted into a mixture of gases that can later be used as a clean, gaseous fuel for heating, power generation, or as a feedstock for chemical synthesis. Chemical synthesis generally requires the use of a medium-Btu (non-nitrogen diluted) gas with minimal contaminants for optimum conversion to chemicals. Medium-Btu gas containing primarily CO and $H_2$ can be generated using oxygen as the gasifying medium in a single-vessel gasification process, but the costs of pure oxygen are high. Alternatively, the gas can be generated by heating the biomass materials indirectly with a circulating heat carrier. The resulting gas is nitrogen free, as in the oxygen blown case, and can contain some level of hydrocarbons in addition to the CO and $H_2$. For medium-Btu gases to be used for chemical synthesis, the gas composition is modified to provide the proper ratio of the synthesis gas constituents hydrogen and carbon monoxide, and to reduce hydrocarbon species that can reduce the effectiveness of conversion catalysts. One common chemical product from such synthesis reactions is methanol. Methanol shows considerable promise as an alternative transportation fuel. The production of methanol from medium-Btu gas is technically feasible using current processing methods, however, the cost is not competitive with conventional fuels. One major area in which cost reductions can be realized is in the preparation of the medium-Btu gas prior to methanol synthesis. Such preparation includes hydrocarbon (tar) destruction, methane reforming, and water-gas shift reactions. To achieve optimum overall process efficiencies, these reactions should take place as hot-gas conditioning operations integrated with the gasifier. Preferably, a gas conditioning catalyst that is employed can destroy or minimize hydrocarbons in the gas and shift the $H_2$ to CO ratio of the gas to 2:1 or higher. The method described herein provides this function.

A fluidized bed gasifier system 100 having the arrangement of FIG. 1 was utilized as the source of a stable supply of synthesis gas. These gasifiers are well known in the art, see U.S. Pat. No. 4,828,581. A gasifier 110 is heated by sand, or other material (including the catalyst discussed herein), circulated between the gasifier 110 and a combustor 120. Output synthesis gas from the gasifier 110 flows to fluidized bed reaction chamber 200 by input line 216. The synthesis gas contained all of the trace constituents that might be present in a commercial scale gasification system.

Figure 2:
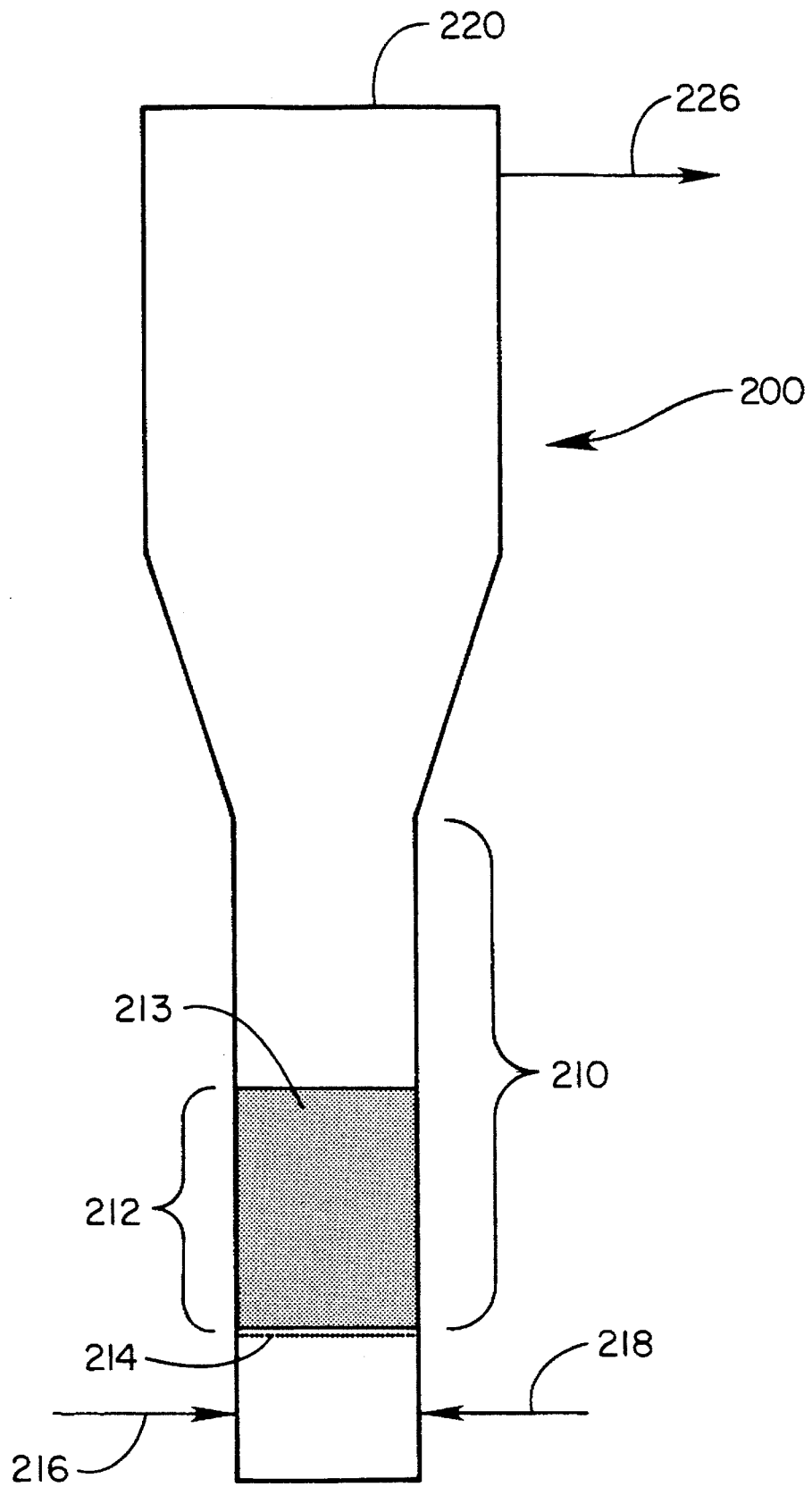
FIG. 2 illustrates a typical reactor for the method of the invention.

A fluidized bed reaction chamber 200, shown in detail in FIG. 2, was installed at the output of a typical fluidized bed gasifier system 100. The catalyst reaction zone 210 was 15.24 cm (6 inches) in diameter and utilized a catalyst bed 212 having a depth of 25.4 cm (10 inches). A 25.4 cm (10 inches) diameter disengaging zone 220 was provided directly above the catalyst reaction zone 210 to minimize entrainment of catalyst particles 213. Gas entered from inlet 216 and exited at outlet 226.

A perforated plate 214 was used to uniformly distribute the synthesis gas. Means for adding additional steam 218 to the synthesis gas with the feed at the input to the reaction chamber was made so that higher water vapor to carbon levels than those present in the entering gas could be achieved.

The gaseous hourly space velocity (GHSV) chosen for the test reactions was about 2000 $m^3/m^3 \cdot hr$. Gas inlet lines for inlet 216 were installed to reflect this nominal design flow rate. Typically, gaseous hourly space velocities of greater than about 1000 $m^3/m^3 \cdot hr$ are preferred. An upper limit for gaseous hourly space velocities of about 5000 $m^3/m^3 \cdot hr$ is preferred. Most preferred are gaseous hourly space velocities of about 1000 $m^3/m^3 \cdot hr$ to about 3000 $m^3/m^3 \cdot hr$.

Temperatures of about 530° C. to about 980° C. are useful in the method herein, although temperatures between about 650° C. to about 870° C. are preferred. The water vapor or steam concentration may be up to 80 vol%. Pressures between about 1 atmosphere and about 40 atmospheres are satisfactory for the reaction.

A second identical chamber (not shown) connected in parallel with the first reaction chamber 100 was added for comparison tests in Examples H17 through S26 so that two catalyst samples could be directly compared.

Two materials were tested during the hot-gas conditioning tests. A first catalyst material, designated DN34, is a pure alumina (99.9% pure) available from Johnson-Matthey, Bradford, Mass., U.S.A. was used for the baseline tests. This material, was ground to a 12×40 mesh size so it could be fluidized in the catalyst chamber 200. The DN34 alumina is a low cost material and is and is disposable without hazardous designations as is the case with other catalyst systems such as those containing nickel.

The second of these was a nickel based cracking catalyst from ICI, Katalco, Two Transcam Plaza Drive, Oak Brook Terrace, Ill., 60181 and was designated ICI-46-1. The catalyst was an extruded material made by co-precipitation, the resulting clay-like material was then extruded and fired. The ICI-46-1 catalyst used for these tests was crushed and screened to provide a suitable material for fluidized bed testing. No change in the metal loading of the catalyst was evident as a result of the grinding operation. A particle size range of 16×40 mesh was chosen for the ICI-46-1 catalyst. There is no practical difference in performance between the 16×40 and 12×40 mesh sizes. The results of the tests with both of these catalyst materials follows.

The initial tests (Tests H10 to H18) with the catalyst, DN34 were designed to develop a baseline performance level with this catalyst material. During these tests no additional steam was added to the incoming synthesis gas over that present at the exit of the gasifier. The synthesis gas fed to the catalyst chamber was taken from the fluidized bed gasifier outlet line where the gas has not been cooled and was fed through a heat traced line to maintain its temperature at approximately 590° C. to 650° C. This slip stream was small in relation to the total synthesis gas stream and so a stable flow of gas could be provided to the reaction chamber 200 regardless of slight changes in synthesis gas production rates in the gasifier 110.

In the examples below, Example numbers beginning with "H" indicate a hybrid poplar feed to the gasifier, while "S" indicates a switch grass feed. To generate data on catalyst life the same catalyst bed was used for all of the tests run with hybrid poplar (Examples H10 through H18). The catalyst was heated and cooled in a nitrogen atmosphere and not exposed to air unless it was at room temperature. No pre-reduction step was utilized for any of the tests with DN34. During these tests, approximately 50 hours of total operation were achieved. Example H17 further verified the stability of DN34 through operation over an 8 hour testing period.

The DN34 catalyst showed a high level of tar destruction as well as a high level of water gas shift activity during the tests run. $C_2+$ hydrocarbons were essentially eliminated from the incoming synthesis gas during all tests except those run at low temperature 650° C. Water gas shift reactivity remained high throughout the tests with the catalyst.

Figure 3:
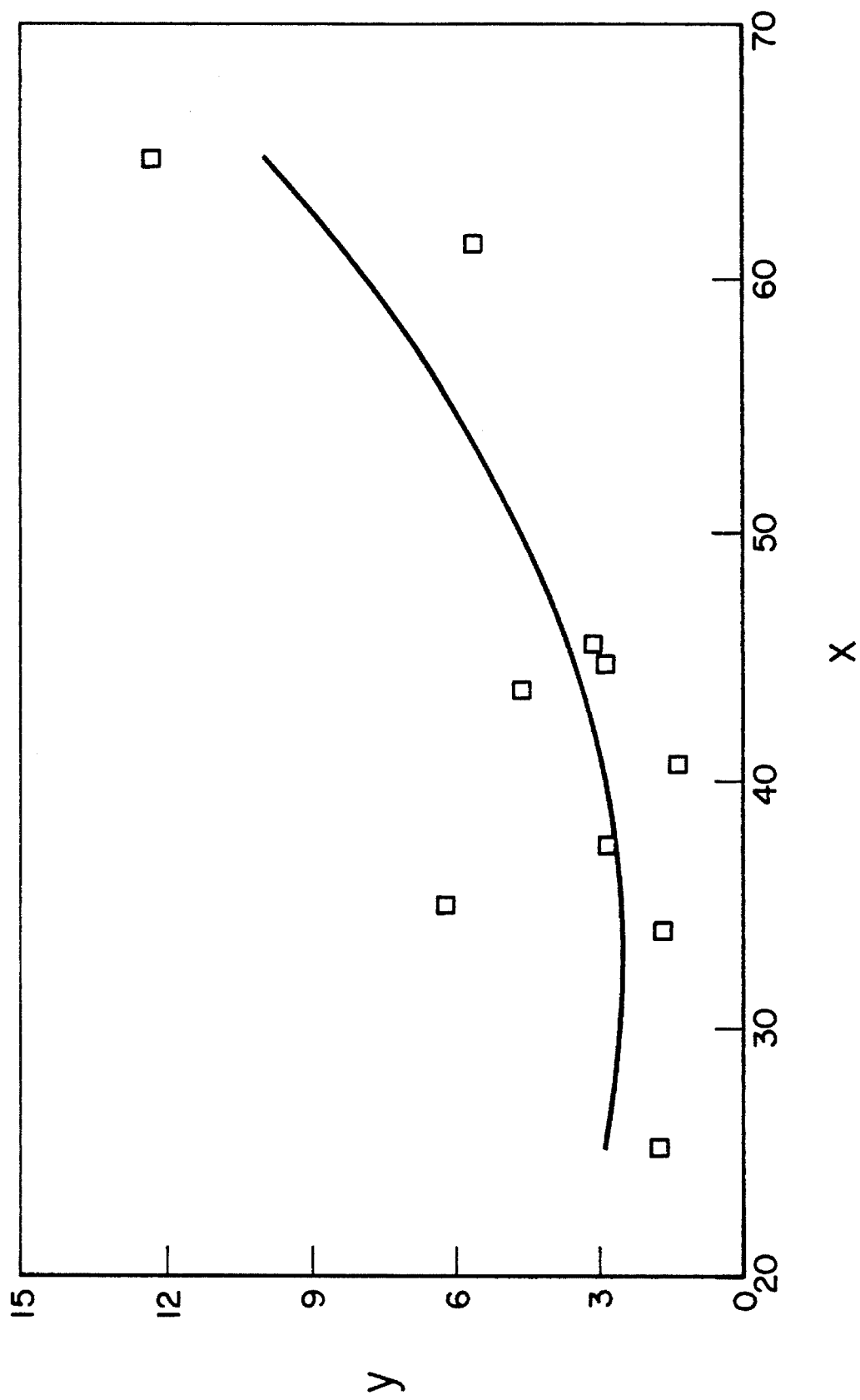
FIG. 3 is a graphical representation of the data from Table II plotted to show the $H_2/CO$ ratio in the Y-axis versus the inlet steam concentration in volume percent in the X-axis.

The reaction results with the DN34 catalyst are shown in Table I below. Comparing these results with the water concentrations in the synthesis gas, shown in Table IV below, shows that at higher steam concentrations in the synthesis gas, a higher $H_2$ to CO ratio can be realized at the outlet of the catalyst chamber. Examples H14 and H15 represent the low steam concentration tests (25 to 30 percent) while Example H16 represents a high steam concentration test (47 percent). These results are summarized in Table II and are shown graphically in FIG. 3. FIG. 3 is plotted to show the $H_2/CO$ ratio in the Y-axis versus the inlet steam concentration in volume percent in the X-axis. As shown, at higher inlet steam concentrations, higher levels of shift can be achieved, assuming sufficient CO is present for reaction. This verifies the use of DN34 and therefore alumina as a shift catalyst.

These target values were used as a guideline in establishing test conditions for the fluidized bed gasifier 110 for Examples S22 through S26. In general, these conditions were achieved with the exception of the high steam level which was 60 to 65 percent during the tests. Higher temperatures coupled with higher steam rates and lower space velocities resulted in higher conversion levels. Example S22-2, run with high temperature 820° C., high steam content (64.9 percent), and low space velocity (1500 $m^3/m^3 \cdot hr$) showed that over 80 percent of the available CO was shifted to $H_2$ and 40 percent of the methane in the incoming synthesis gas was destroyed. No degradation of the catalyst was evident during the test or in subsequent tests at this temperature. Commercial cracking catalysts tend to lose activity at temperatures above about 760° C. Higher temperatures, higher steam content, and lower space velocities in general provide higher levels of activity while lower temperatures, steam levels, and higher space velocities tend to decrease reaction.

In Example H18-1 there was no catalyst present in one of the parallel chambers to confirm that the catalysts were indeed the source of the activity and not the piping or the stainless steel reactor walls. As shown in Table I, the inlet and outlet gas compositions were essentially the same verifying the catalytic effect of the DN34 catalyst.

TABLE I

Catalyst Testing Results Gas Chromatograph Data (vol %)

| Gas Content | Example H12 IN | Example H12 DN34 OUT | Example H14 IN | Example H14 DN34 OUT | Example H15 IN | Example H15 DN34 OUT | Example H16 IN | Example H16 DN34 OUT | Example H17 1 IN | Example H17 1 DN34 OUT | Example H17 2 ICI-46-1 OUT | Example H18 1 IN | Example H18 1 EMPTY | Example H18 2 ICI-46-1 OUT |
|---|---|---|---|---|---|---|---|---|---|---|---|---|---|---|
| $H_2$ | 26.8 | 39.5 | 25.7 | 41.3 | 26.2 | 36.7 | 27.3 | 38.2 | 24.5 | 43.1 | 49.2 | 26.1 | 27.1 | 43.4 |
| $CO_2$ | 14.8 | 48.3 | 15.1 | 20.5 | 15.1 | 25.4 | 15.4 | 33.9 | 15.4 | 27.6 | 7.08 | 15.2 | 19.7 | 14.5 |
| $C_2H_4$ | 5.17 | 0.00 | 5.21 | 1.50 | 4.79 | 1.68 | 5.28 | 0.19 | 5.22 | 0.00 | 0.00 | 4.71 | 4.21 | 2.29 |
| $C_2H_6$ | 0.31 | 0.00 | 0.40 | 0.23 | 0.39 | 0.54 | 0.48 | 0.20 | 0.43 | 0.23 | 0.00 | 0.36 | 0.32 | 0.00 |
| $C_2H_2$ | 0.73 | 0.00 | 0.61 | 0.00 | 0.50 | 0.00 | 0.87 | 0.00 | 0.56 | 0.00 | 0.00 | 0.48 | 0.00 | 0.00 |
| $CH_4$ | 14.3 | 5.80 | 14.6 | 11.0 | 14.9 | 14.5 | 14.4 | 13.9 | 15.4 | 13.6 | 0.53 | 14.9 | 14.0 | 6.64 |
| CO | 38.0 | 6.41 | 38.4 | 25.5 | 38.2 | 21.1 | 36.2 | 13.6 | 38.4 | 15.4 | 42.8 | 38.3 | 34.5 | 33.1 |

TABLE II

SUMMARY OF WATER GAS SHIFT DATA--DN34 CATALYST

| Example No. | Catalyst | Inlet $H_2O$, vol % | Inlet $H_2/CO$ Ratio | Outlet $H_2/CO$ Ratio | GHSV* | Catalyst Temp. °C. |
|---|---|---|---|---|---|---|
| H12 | DN34 | 35.0 | 0.70 | 6.17 | 2590 | 760 |
| H14 | DN34 | 34.0 | 0.67 | 1.62 | 1640 | 760 |
| H15 | DN34 | 25.3 | 0.69 | 1.74 | 2090 | 760 |
| H16 | DN34 | 44.7 | 0.75 | 2.83 | 2240 | 760 |

TABLE II-continued

SUMMARY OF WATER GAS SHIFT DATA--DN34 CATALYST

| Example No. | Catalyst | Inlet H$_2$O, vol % | Inlet H$_2$/CO Ratio | Outlet H$_2$/CO Ratio | GHSV* | Catalyst Temp. °C. |
|---|---|---|---|---|---|---|
| H17-1 | DN34 | 37.4 | 0.64 | 2.80 | 2760 | 760 |
| H18-2 | ICI-46-1 | 40.6 | 0.73 | 1.31 | 2700 | 760 |
| S22-1 | DN34 | 38.9 | 0.55 | 1.08 | 2460 | 650 |
| S22-2 | DN34 | 64.9 | 0.55 | 12.25 | 1650 | 820 |
| S23-1 | DN34 | 65.5 | 0.59 | 0.65 | 1480 | 650 |
| S23-2 | DN34 | 43.7 | 0.59 | 4.54 | 2420 | 820 |
| S24-1 | DN34 | 45.6 | 0.66 | 4.38 | 1530 | 650 |
| S24-2 | DN34 | 61.5 | 0.66 | 5.54 | 2530 | 820 |
| S25 | DN34 | 56.0 | 0.64 | 0.67 | 2500 | 650 |
| S26-1 | DN34 | 61.4 | 0.59 | 1.25 | 2510 | 650 |
| S26-2 | DN34 | 45.5 | 0.59 | 3.06 | 1520 | 820 |

*GHSV - gaseous hourly space velocity, m$^3$/m$^3$ · hr

TABLE III

GAS CHROMATOGRAPH RESULTS - DN34 CATALYST TESTING SWITCH GRASS FEEDSTOCK

| DRY GAS % | Example S22 INLET | OUT-1 Reactor Condition 650° C. 2500 GHSV. 38.9 vol % H$_2$O | OUT-2 Reactor Condition 820° C. 1500 GHSV. 64.9 vol % H$_2$O | Example S23 INLET | OUT-1 Reactor Condition 820° C. 2500 GHSV. 43.7 vol % H$_2$O | OUT-2 Reactor Condition 650° C. 1500 GHSV. 65.5 vol % H$_2$O |
|---|---|---|---|---|---|---|
| H$_2$ | 17.43 | 24.09 | 46.67 | 16.74 | 38.69 | 16.73 |
| CO$_2$ | 10.75 | 15.46 | 27.18 | 11.79 | 24.13 | 11.96 |
| C$_2$H$_4$ | 4.20 | 3.43 | 0.33 | 3.90 | 1.34 | 3.64 |
| C$_2$H$_6$ | 0.24 | 0.32 | 0.00 | 0.31 | 0.27 | 0.25 |
| C$_2$H$_2$ | 0.56 | 0.00 | 0.00 | 0.41 | 0.00 | 0.39 |
| N$_2$ | 24.47 | 24.52 | 15.89 | 28.67 | 19.28 | 32.13 |
| CH$_4$ | 10.67 | 9.94 | 6.12 | 9.77 | 7.77 | 9.13 |
| CO | 31.68 | 22.24 | 3.81 | 28.41 | 8.52 | 25.77 |

| DRY GAS % | Example S24 INLET | OUT-1 Reactor Condition 650° C. 1500 GHSV. 45.6 vol % H$_2$O | OUT-2 Reactor Condition 820° C. 2500 GHSV. 61.5 vol % H$_2$O | Example S25 INLET | OUT Reactor Condition 650° C. 2500 GHSV. 56 vol % H$_2$O | Example S26 INLET | OUT-1 Reactor Condition 820° C. 1500 GHSV. 45.5 vol % H$_2$O | OUT-2 Reactor Condition 650° C. 2500 GHSV. 61.4 vol % H$_2$O |
|---|---|---|---|---|---|---|---|---|
| H$_2$ | 18.23 | 33.01 | 35.86 | 18.40 | 15.33 | 16.77 | 34.74 | 23.85 |
| CO$_2$ | 11.74 | 24.14 | 24.84 | 11.66 | 13.37 | 11.26 | 22.60 | 17.32 |
| C$_2$H$_4$ | 3.67 | 2.07 | 1.68 | 3.68 | 3.08 | 3.66 | 1.52 | 3.30 |
| C$_2$H$_6$ | 0.21 | 0.39 | 0.2 | 0.20 | 0.11 | 0.17 | 0.21 | 0.17 |
| C$_2$H$_2$ | 0.39 | 0.00 | 0.00 | 0.38 | 0.13 | 0.45 | 0.00 | 0.00 |
| N$_2$ | 28.22 | 24.05 | 22.76 | 26.98 | 36.45 | 29.66 | 20.98 | 26.91 |
| CH$_4$ | 9.78 | 8.81 | 8.20 | 10.14 | 8.54 | 9.85 | 8.62 | 9.41 |
| CO | 27.75 | 7.53 | 6.47 | 28.55 | 22.99 | 28.19 | 11.34 | 19.04 |

*GHSV - gaseous hourly space velocity, m$^3$/m$^3$ · hr

A nickel-based commercial cracking catalyst was acquired from ICI-Katalco. The manufacturer's designation for this catalyst is ICI-46-1. The catalyst is a supported nickel oxide catalyst that has been promoted with potash to prevent the formation and accumulation of carbon during steam reforming reactions. The catalyst is shipped as rashig rings. These rings were crushed to provide the appropriate particle size for fluidized bed operation. The manufacturer's startup and conditioning procedures were followed. The startup procedure reduces the nickel oxide to nickel metal and removes sulfur from the surface of the catalyst. This is necessary since the catalyst is shipped in the sulfided state to protect the active metal from contamination.

Examples with the ICI-46-1 catalyst in place were run during fluidized bed gasifier Examples H17-2 and H18-1. The catalyst showed a significant reduction in activity from Example H17-2 to Example H18-1 as evidenced by the methane concentration in the outgoing synthesis gas. Table I shows that the methane concentration at the exit of the catalyst chamber rose from 0.53 percent to 6.64 percent in Examples H17-2 and H18-1, respectively. Steam concentrations and catalyst bed temperatures were approximately the same for both of these tests. A somewhat higher space velocity was utilized during Example H17-2 (2666 vs 2530 in Example H18-1) which further confirms the loss in activity. Temperatures during the tests with ICI-46-1 were within the recommended operating temperature range suggested by the manufacturer, who lists temperatures up to 1000° C. when used in combination with other catalysts as would be the case in a methanol system or 850° C. when used alone. Steam concentrations in the incoming synthesis gas were likewise within the recommended range for this catalyst. The reduction in activity, therefore, was not caused by any external variables, but rather was a characteristic levelling off of activity during the initial hours of operation of the catalyst.

The ICI-46-1 catalyst is a highly specific cracking catalyst. As such, it exhibited very little water gas shift activity as shown by the CO concentrations at the exit of the catalyst chamber. To provide the proper $H_2$ to CO ratio using ICI-46-1 as a hot-gas conditioning catalyst will require a second water-gas shift catalyst chamber separate from a first reaction chamber to accomplish the water gas shift. Such a second chamber will increase the capital and operating costs of commercial scale methanol production.

The ICI-46-1 catalyst is specifically designed to be effective in cracking hydrocarbons with boiling points up to 220° C. The tests run in the fluidized bed gasifier verified this design criteria. The reduction in tar concentration from the incoming synthesis gas was less than that evident with the DN34 catalyst as shown in Table IV below.

For example, the hydrogen:carbon monoxide ratio in the synthesis gas was raised from 0.7:1 to over 2.0:1 and tar content of the synthesis gas was reduced an order of magnitude or more by use of the DN34 catalyst.

The concentration of higher hydrocarbons such as tar (condensible species) in the synthesis gas fed to the reaction chamber 200 and the concentration of condensibles in the outlet 226 from the reaction chamber 200 was determined. The results of these sample collections are provided in Table IV. As shown, in each case, a significant reduction of the condensible material in the outlet gas stream was evident as a result of passing through the catalyst chamber 200. In all cases, the tar concentration was reduced by an order of magnitude or more regardless of the catalyst used.

Inlet tar concentration depended in most cases on the type of feed material being gasified. For example, the tars produced from switch grass (Examples S21 to S26) were less than 50 percent of those produced with the hybrid poplar (Examples H10 to H18). Tar production from hybrid poplar was about 0.016 kg/m³ or approximately 1 percent of the dry weight of wood fed to the gasifier 110. The switch grass production rate was about 0.0080 kg/m³ or approximately 0.5 percent of the dry feed rate.

TABLE IV

Tar Collection Results
Hybrid Poplar Feed to Gasifier

| Example No. | Catalyst in Reactor | Tar Measured at | Water kg/m³ | Water vol. % | Total Tar kg/m³ |
|---|---|---|---|---|---|
| H10 | DN34 | INPUT | 0.546 | 40.5 | 0.0216 |
|  |  | OUTPUT | 0.735 | 47.8 | 0.00001 |
| H11 | DN34 | INPUT | 0.668 | 45.4 | 0.0199 |
|  |  | OUTPUT | 0.051 | 5.97 | 0.00000 |
| H13 | DN34 | INPUT | 0.553 | 40.7 | 0.0210 |
|  |  | OUTPUT | 0.050 | 5.83 | 0.0002 |
| H14 | DN34 | INPUT | 0.276 | 22.6 | 0.0261 |
|  |  | OUTPUT | 0.243 | 23.3 | 0.0006 |
| H15 | DN34 | INPUT | 0.272 | 25.3 | 0.0171 |
|  |  | OUTPUT | 0.248 | 23.7 | 0.0027 |
| H16 | DN34 | INPUT | 0.654 | 44.7 | 0.0176 |
|  |  | OUTPUT | 0.136 | 14.5 | 0.00000 |
| H17 |  | INPUT | 0.497 | 37.5 | 0.0370 |
|  | DN34 | OUTPUT-1 | 0.207 | 20.4 | 0.0005 |
|  | ICI-46-1 | OUTPUT-2 | 0.053 | 6.11 | 0.0036 |
| H18 |  | INPUT | 0.545 | 40.7 | 0.0089 |
|  | EMPTY | OUTPUT-1 | 0.259 | 24.5 | 0.0014 |
|  | ICI-46-1 | OUTPUT-2 | 0.104 | 11.5 | 0.0002 |
| S21 | DN34 | INPUT | 0.616 | 43.3 | 0.0081 |
|  |  | OUTPUT-1 | 0.000 | 0.000 | 0.00000 |
|  |  | OUTPUT-2 | 0.251 | 23.9 | 0.00000 |
| S22 | DN34 | INPUT | 0.511 | 38.8 | 0.0068 |
|  |  | OUTPUT-2 | 2.139 | 72.6 | 0.00000 |
| S23 | DN34 | INPUT | 0.623 | 43.6 | 0.0051 |
|  |  | OUTPUT-1 | 0.852 | 51.5 | 0.00000 |
|  |  | OUTPUT-2 | 2.435 | 75.2 | 0.0007 |
| S24 | DN34 | INPUT | 0.674 | 45.6 | 0.0089 |
|  |  | OUTPUT-1 | 0.466 | 36.7 | 0.00000 |
|  |  | OUTPUT-2 | 2.018 | 71.5 | 0.00000 |
| S25 | DN34 | INPUT | 0.503 | 38.5 | 0.0094 |
|  |  | OUTPUT-2 | 0.863 | 51.8 | 0.0050 |
| S26 | DN34 | INPUT | 0.593 | 42.3 | 0.0105 |
|  |  | OUTPUT-1 | 0.565 | 41.3 | 0.0004 |

Six additional examples illustrate the invention further. The first five, Examples W1 to W5, used the reaction chambers 200 as described above. The sixth example, Example W6 (A and B), used the catalyst as a circulating phase in place of sand in the fluidized bed gasifier system 100. Operation with the catalyst as a circulating phase can eliminate the need for a downstream reactor system which will result in reduced capital and operating costs.

Table V summarizes the results of tests W1 through W5. The catalyst chambers previously utilized above were connected essentially as before. The same gaseous hourly space velocity to the catalyst chamber of approximately 2000 m³/m³·hr was also used. The catalyst chamber temperature was controlled at approximately 820° C. and no additional steam was added as part of the feed gas. The operating temperature of the gasifier 110 and catalyst 213 are shown in the table. Catalyst DN34 as above was used as well as catalyst DN40 (a similar material made by Girdler, a catalyst manufacturer) and is an alumina support material with no impregnation. Catalyst DN 50 is a fused alumina from Norton (a refractory supplier) and provides a measurement of the effect of internal surface area on the catalyst activity. Conventional wisdom would indicate that a reduction in internal surface would result in no catalytic activity of the material.

As an indication of the effectiveness of the catalyst formulations as cracking catalysts, the conversion of ethane ($C_2H_6$) was monitored. During earlier examples discussed above (H series and S series), ethane conversion was found to, in most cases, parallel the conversion of the tar constituents in the gas. Detailed measurements of tar conversion were not made in the following examples, however, visual observation of the gas chromatograph sample lines indicated that tar was greatly reduced when compared with the raw synthesis gas from the gasifier 110.

Another significant measure of the catalysts activity is the water gas shift activity. These tests showed activity ranging from 22 to 77%. The fused material gave the lowest activity and the DN34 material, the highest. Even 22% activity is significant and can potentially be improved by use of alternate test conditions.

TABLE V

Alumina Catalyst Example W1 Through W5 Data

| | Example | | | | | |
|---|---|---|---|---|---|---|
| | W1 IN | W1 OUT | W2 IN | W2 OUT | W3 IN | W3 OUT |
| Catalyst Number | DN34 | | DN34 | | DN40 | |
| Gasifier Temp. °C. | 836 | 831 | 838 | 841 | 828 | 821 |
| Catalyst Temp. °C. | | 794 | | 801 | | 786 |
| NITROGEN FREE GAS ANALYSIS (vol %) | | | | | | |
| $H_2$ | 25.4 | 48.2 | 20.3 | 47.9 | 20.5 | 39.4 |
| $CO_2$ | 12.4 | 29.5 | 11.8 | 28.2 | 9.2 | 15.8 |
| $C_2H_4$ | 5.2 | 2.1 | 5.8 | 1.3 | 6.0 | 2.1 |
| $C_2H_6$ | 0.4 | 0.2 | 0.5 | 0.2 | 0.5 | 0.3 |
| $C_2H_2$ | 0.8 | 0.0 | 0.8 | 0.0 | 0.8 | 0.0 |
| $CH_4$ | 13.2 | 10.3 | 14.6 | 11.2 | 14.1 | 11.8 |
| CO | 42.7 | 9.7 | 46.2 | 11.1 | 48.8 | 30.6 |
| GAS CONVERSIONS (vol %) | | | | | | |
| CO Conversion | | 77 | | 75 | | 37 |
| $C_2H_6$ Conversion | | 32 | | 58 | | 37 |

| | Example | | | |
|---|---|---|---|---|
| | W4 IN | W4 OUT | W5 IN | W5 OUT |
| Catalyst Number | DN40 | | DN50 | |
| Gasifier Temp. °C. | 843 | 849 | 806 | 808 |
| Catalyst Temp. °C. | | 822 | | 764 |
| NITROGEN FREE GAS ANALYSIS (vol %) | | | | |
| $H_2$ | 28.0 | 40.1 | 20.0 | 28.0 |
| $CO_2$ | 12.0 | 17.3 | 9.4 | 13.0 |
| $C_2H_4$ | 4.6 | 2.5 | 5.9 | 4.8 |
| $C_2H_6$ | 0.3 | 0.0 | 0.6 | 0.2 |
| $C_2H_2$ | 0.6 | 0.0 | 0.6 | 0.3 |
| $CH_4$ | 13.7 | 11.3 | 13.8 | 13.6 |
| CO | 40.8 | 28.8 | 51.8 | 40.2 |
| GAS CONVERSIONS (vol %) | | | | |
| CO Conversion | | 30 | | 22 |
| $C_2H_6$ Conversion | | 100 | | 67.2 |

Another embodiment of the invention involves the use of the alumina catalyst as a recirculating phase. By this method hot-gas conditioning can be greatly simplified and economics can be improved by the possible elimination of the hot-gas conditioning unit operation. The alumina should be ground or granulated so as to act in the same manner as the heat transfer agent that it partially or completely replaces. The granulated alumina will preferably be of a size and density to provide a balance between catalytic characteristics, heat transfer characteristics, and flowability.

Gasifier 110 conditions were controlled at approximately 820° C. and steam input of approximately 1 kg per kg of feedstock (wood) fed to maximize the water vapor in the synthesis gas. Operation in this mode allowed the reactor chamber 200 operation to be made without the addition of steam to the incoming synthesis gas. In the examples herein it was noted that the ground alumina used did not flow as well as the sand that it replaced, thus the particles are preferably free flowing particles having flow characteristics adapted to recirculating systems, i.e. similar to or better than sand.

Table VI shows examples using DN34 as a circulating bed material. Here, as in the previous tests, definite water gas shift activity is noticed as well as conversion of ethane. Two different temperature levels were possible in these tests and the gas compositions are compared with those obtained during previous tests without the catalyst circulating phase to establish the activity levels. Even at the lower temperature in Example W6-B a significant increase in hydrogen is noticed, illustrating significant shift activity.

TABLE VI

Catalyst Example W6 Data
Use of DN 34 as a Circulating Phase

| Example | W3 | W6-A | W5 | W6-B |
|---|---|---|---|---|
| Catalyst Number | DN 34 | | DN 34 | |
| Gasifier Temp. °C. | 828 | 835 | 806 | 808 |
| Catalyst Temp. °C. | | 835 | | 808 |
| NITROGEN FREE GAS ANALYSIS (vol %) | | | | |
| $H_2$ | 20.5 | 36.2 | 20.0 | 36.5 |
| $CO_2$ | 9.2 | 20.5 | 9.4 | 20.7 |
| $C_2H_4$ | 6.0 | 4.0 | 5.9 | 3.9 |
| $C_2H_6$ | 0.5 | 0.4 | 0.6 | 0.4 |
| $C_2H_2$ | 0.8 | 0.0 | 0.6 | 0.0 |
| $CH_4$ | 14.1 | 12.4 | 13.8 | 12.1 |
| CO | 48.8 | 26.61 | 51.8 | 26.4 |
| GAS CONVERSIONS (vol %) BASED ON PRIOR TEST OUTPUT GAS | | | | |
| CO Conversion | | 45.6 | | 49 |
| $C_2H_6$ Conversion | | 27 | | 36 |

With all of the materials tested, alumina continued to show activity as both a cracking and shift catalyst. The alumina provides significant advantages in terms of initial cost and disposal cost because of the elimination of noble metals from the catalyst.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

What is claimed is:

1. A method for cracking and shifting a synthesis gas comprising:

a. providing a catalyst consisting essentially of alumina;

b. contacting said catalyst with said synthesis gas comprising a substantially oxygen free mixture of gases of water vapor, carbon monoxide, hydrogen, and hydrocarbons having one or more carbon atoms, at a temperature between about 530° C. (1000° F.) to about 980° C. (1800° F.), at up to 80 volume percent water vapor, and at a gaseous hourly space velocity greater than about 1000 $m^3/m^3$·hr adapted to substantially eliminate carbon formation; whereby said hydrocarbons are cracked to form hydrogen, carbon monoxide and/or carbon dioxide and the hydrogen content of said mixture shifted so as to increase with a corresponding decrease in carbon monoxide.

2. The method of claim 1, further comprising a gaseous hourly space velocity greater than about 1000 m$^3$/m$^3$·hr to about 5000 m$^3$/m$^3$·hr.

3. The method of claim 1, comprising completing said cracking and shifting reaction in one reaction zone.

4. The method of claim 1, wherein said contacting is carried out in a fluidized bed reactor.

5. The method of claim 1, wherein said contacting is carried out in a recirculating fluidized bed gasifier.

6. The method of claim 1, wherein said contacting is carried out in a fixed bed reactor.

7. The method of claim 1, wherein said temperature is between about 650° C. to about 870° C.

8. The method of claim 1, wherein the H$_2$/CO ratio is increased by adjusting the amount of water vapor.

9. The method of claim 1, wherein the H$_2$/CO ratio is shifted to 2:1 or higher.

10. A method for cracking and shifting a synthesis gas comprising:
   a. providing a catalyst consisting essentially of alumina;
   b. contacting said catalyst with a substantially oxygen free synthesis gas comprising:
      (1) carbon monoxide, hydrogen, methane and/or higher hydrocarbons; and
      (2) water vapor at a concentration of up to 80 volume percent;
at a temperature of about 530° C. to about 980° C. and a gaseous hourly space velocity greater than about 1000 m$^3$/m$^3$·hr adapted to substantially eliminate carbon formation, whereby methane and higher hydrocarbons are cracked according to the reaction, $$C_xH_{2y}+xH_2O=xCO+(1+y+x)H_2$$

and shifted by the reaction, $$CO+H_2O=CO_2+H_2$$

11. The method of claim 9, further comprising a gaseous hourly space velocity greater than about 1000 m$^3$/m$^3$·hr to about 5000 m$^3$/m$^3$·hr.

12. The method of claim 10, comprising completing said cracking and shifting reactions in one reaction zone.

13. The method of claim 10, wherein said contacting is carried out in a fluidized bed reactor.

14. The method of claim 10, wherein said contacting is carried out in a recirculating fluidized bed gasifier.

15. The method of claim 10, wherein said contacting is carried out in a fixed bed reactor.

16. The method of claim 10, wherein said temperature is between about 650° C. to about 870° C.

17. The method of claim 10, wherein the H$_2$/CO ratio is increased by adjusting the amount of water vapor.

18. The method of claim 10, wherein the H$_2$/CO ratio is shifted to 2:1 or higher.

19. A method for cracking and shifting a substantially oxygen free synthesis gas comprising:
   a. providing a reaction zone with a catalyst consisting essentially of alumina;
   b. flowing said synthesis gas, comprising carbon monoxide, hydrogen, methane and/or higher hydrocarbons, into said reaction zone and contacting said catalyst;
   c. simultaneously with step b., flowing 0 to about 80 volume percent water vapor into contact with said catalyst;
at a temperature of about 530° C. to about 980° C., and Wherein the combined gaseous hourly space velocity for steps b and c is greater than about 1000 m$^3$/m$^3$·hr, adapted to substantially eliminate carbon formation, whereby methane and higher hydrocarbons in said synthesis gas are cracked according to the reaction, $$C_xH_{2y}+xH_2O=xCO+(1+y+x)H_2$$

and shifted by the reaction, $$CO+H_2O=CO_2+H_2$$

20. The method of claim 19, further comprising a gaseous hourly space velocity greater than about 1000 m$^3$/m$^3$·hr to about 5000 m$^3$/m$^3$·hr.

21. The method of claim 19, comprising completing said cracking and shifting reactions in one reaction zone.

22. The method of claim 19, wherein said contacting is carried out in a fluidized bed reactor.

23. The method of claim 19, wherein said contacting is carried out in a recirculating fluidized bed gasifier.

24. The method of claim 19, wherein said contacting is carried out in a fixed bed reactor.

25. The method of claim 19, wherein said temperature is between about 650° C. to about 870° C.

26. The method of claim 19, wherein the H$_2$/CO ratio is increased by adjusting the amount of water vapor.

27. The method of claim 19, wherein the H$_2$/CO ratio is shifted to 2:1 or higher.

28. A method for cracking and shifting a synthesis gas comprising:
   a. providing a catalyst consisting essentially of granulated alumina;
   b. contacting said catalyst with said synthesis gas comprising a substantially oxygen free mixture of gases of carbon monoxide, hydrogen, water vapor and hydrocarbons having one or more carbon atoms, at a temperature between about 530° C. (1000° F.) to about 980° C. (1800° F.), at up to 80 volume percent water vapor, and at a gaseous hourly space velocity greater than about 1000 m$^3$/m$^3$·hr adapted to substantially eliminate carbon formation;
   c. circulating said catalyst between a gasifier where said contacting is accomplished, and a combustor where said catalyst is heated to maintain said temperatures when said catalyst is recirculated to said gasifier; and whereby said hydrocarbons are cracked to form hydrogen, carbon monoxide and/or carbon dioxide and said hydrogen content of said mixture increases with a corresponding decrease in carbon monoxide.

29. The method of claim 28, further comprising a gaseous hourly space velocity greater than about 1000 m$^3$/m$^3$·hr to about 5000 m$^3$/m$^3$·hr.

30. The method of claim 28, comprising completing said cracking and shifting reactions in one reaction zone.

31. The method of claim 28, wherein said contacting temperature is between about 650° C. to about 870° C.

32. The method of claim 28, wherein the H$_2$/CO ratio is increased by adjusting the amount of water vapor.

33. The method of claim 28, wherein the H$_2$/CO ratio is shifted to 2:1 or higher.

* * * * *

UNITED STATES PATENT AND TRADEMARK OFFICE
CERTIFICATE OF CORRECTION

PATENT NO. : 5,494,653
DATED : February 27, 1996
INVENTOR(S) : Mark A. Paisley

It is certified that error appears in the above—identified patent and that said Letters Patent is hereby corrected as shown below:

Columns 7-8, TABLE III, "OUT-1 Reactor Condition 650°C. 2500 GHSV." should be -- OUT-1 Reactor Condition 650°C. 2500 GHSV.* --.

Column 12, TABLE VI, column under W6-A "26.61" should be -- 26.6 --.

Column 13, line 41, "$CO+H_2O=CO_2+H_2$" should be -- $CO+H_2O=CO_2+H_2$. --.

Column 13, line 42, "claim 9," should be -- claim 10, --.

Column 14, line 5, "Wherein" should be -- wherein --.

Column 14, line 14, "$CO+H_2O=CO_2+H_2$" should be -- $CO+H_2O=CO_2+H_2$. --.

Signed and Sealed this

Twenty-sixth Day of November 1996

Attest:

BRUCE LEHMAN

Attesting Officer   Commissioner of Patents and Trademarks